United States Patent Office 3,282,902
Patented Nov. 1, 1966

3,282,902
CURABLE POLYSULFIDE COMPOSITIONS,
METHODS AND VULCANIZATES
Julian R. Panek, Newtown, Pa., assignor to Thiokol Chemical Corporation, Bristol, Pa., a corporation of Delaware
No Drawing. Filed Dec. 4, 1963, Ser. No. 328,054
12 Claims. (Cl. 260—79.1)

The present invention relates to improved, curable organic polysulfide polymer based compositions having prolonged working life, to a method for their cure and to the novel vulcanizates obtained thereby.

An object of this invention is to provide curable polysulfide polymer based compositions which have a prolonged working life.

Another object of this invention is to provide curable polysulfide polymer based compositions which maintain their work life for prolonged periods at ambient temperatures but which may be cured to form elastomeric vulcanizate based compositions having good physical properties within relatively short intervals at elevated temperatures.

A further object of this invention is to provide a method for the production of good elastomeric based compositions from curable polysulfide polymer based compositions having prolonged working life.

A still further object of this invention is to provide polysulfide polymer based vulcanizates which are substantially resistant to bloom of the curing catalyst therein.

Other desirable objects of this invention will be apparent from or inherent in the following explanations and examples.

Polysulfide polymers of the type disclosed in the Patrick and Ferguson patent, U.S. 2,466,963, are now well known in the art and have been extensively used for a variety of commercial applications. When cured to form rubberlike solids, they possess a number of commercially important properties. They are inert to oil, most solvents, water and mild acids and alkalies, as well as to ozone and sunlight. They are tough and resilient and retain their flexibility at extremely low temperatures. Moreover, they are impermeable to gases and moisture and are capable of adhering tenaciously to such diverse materials as glass, metals, plastics, wood, leather and fabrics. Because of these valuable properties, they have been extensively used as impregnating, sealing, caulking and coating materials as well as for a variety of special uses such as gasoline hose, printers rolls and potting compounds for electrical components.

The polysulfide polymers are characterized by the fact that they have recurring polysulfide linkages between organic radicals having at least two primary carbon atoms for connection to the disulfide linkages. Thus, for example, disulfide polymers have a general structure corresponding to the formula

HS(RSS)$_n$RSH in which the R's are organic radicals, preferably predominantly divalent aliphatic radicals such as diethyl formal radicals, and $n$ is an integer which may vary from a relatively small number in the case of liquid polymers having a molecular weight of about 500 to 12,000 to a relatively large number in the case of solid polymers which may have a molecular weight of 100,000 or more. These polysulfide polymers are preferably formed by reaction of a dihalide corresponding to R with a polysulfide in the presence of a relatively minor amount of a polyfunctional crosslinking agent such as trichloropropane, either with or without subsequent splitting of the polymer to form liquid polymers as described in Patrick and Ferguson patent, U.S. 2,466,963.

Methods and materials for effecting the vulcanization of liquid polysulfide polymers have heretofore been proposed. Thus, for example, metal oxide curing agents for liquid polysulfide polymers have been suggested in the aforementioned patent to Patrick and Ferguson and in the Patrick U.S. Patents 2,195,380 and 2,206,643. Further, the use of aryl and alkaryl nitro compounds as curing agents for solid curable polysulfide polymers has been proposed by Patrick in U.S. 2,195,380 and 2,206,643. Rosenthal (U.S. 2,940,959) used dinitrobenzene and trinitrobenzene with maganite-coated manganese dioxide curing agent to vulcanize relatively low molecular weight, i.e., about 1000, liquid polysulfide polymers.

It is well known in the art that the use of nitroaryl compounds with metal oxide curing agents provides a synergistic effect in the vulcanization of liquid polysulfide polymers. The amounts of each of the metal oxide and nitroaryl compounds needed to produce the synergistic effect when they are used in combination are, in general, substantially less than the amounts of either that are needed when they are used alone as vulcanizing agents. The use of the prior art metal oxide/nitroaryl compound cure systems, however, has certain disadvantages. For example, such combined curing systems as used in the prior art will, upon admixture with the liquid polysulfide polymers, rapidly cure the polymers at room temperature, e.g., 25° C. The curable compositions will thus thicken from a mixture of workable consistency, to a heavy syrup or to a gelled or set condition of unworkable consistency at room temperature in a very short time. The attainment of the unworkable consistency usually occurs over a period as short as one half to two hours. It is only during the interval of relative workability of the cure compositions and prior to gellation that the polymer systems may be readily worked to coat or pot articles, or to fill molds. This interval is known in the art as the "working life" or "pot life" of the compositions. The progressive and rapid thickening of the prior art curable polysulfide compositions during the working life also makes divestiture of occluded and dissolved gas therefrom most difficult if not impossible, and thus to provide in the end rubber articles having undesirable surface pock marks and internal voids.

The metal oxide/nitroaryl curing systems of the prior art provide yet another substantial disadvantage. The rubbery products obtained therewith are subject to undesirable migration of the nitroaryl compounds to the surfaces of the rubber articles produced, there to accumulate and discolor with an unsightly blush or bloom. This is known in the art as "blooming." The blooming resulting from the use of the prior art nitroaryl compounds not only detracts from the aesthetic value of the molded end articles made therewith, but it is also believed to detract from the utility of articles for certain end uses, such as for printers rolls. The "bloom" can usually be wiped off prior to use of the article, but as more of the nitroaryl compounds as used in the prior art migrate to the surfaces, the bloom reappears in time.

It has now been discovered that where orthonitroanisole is used to the extent of about 2 to 50 parts by weight per 100 parts by weight of liquid polysulfide polymers of the type revealed in U.S. 2,466,963 in admixture with those metal oxide curing agents known to be useful in promoting the vulcanization of liquid polysulfide polymers that (1) curable compositions are formed which have prolonged working lives at room temperatures, e.g., about 80° F., which often extend into days; (2) the curable compositions will quickly cure to form elastomers with good physical properties at elevated temperatures of 140° F. to 200° F., in ½ to 8 hours, the longer intervals occurring at the lower curing temperatures; (3) upon cure, novel vulcanizates are produced which are extraordinarily bloom resistant for extended periods of time. Other important benefits were found to obtain through the use of orthonitroanisole as the nitroaryl compound component of the curing agent system. The nitroaryl curing agent materials of the prior art require a minimum of three passes on a paint mill for uniform incorporation into the curable compositions; orthonitroanisole requires but one. Further, the rapidly thickening curable compositions containing the nitroaryl compounds of the prior art makes it difficult to divest them of dissolved and occluded gases, whereas, with the compositions of this invention removal of gases is made relatively simple and rapid because of their prolonged work life.

At the present time, it is not known why such unexpected values are obtained through the use of orthonitroanisole. However, where less than 2 parts of orthonitroanisole are used per hundred of polythiopolymercaptan liquid polymer no significant synergism with metal oxide curing agents appears. Where more than 50 parts of orthonitroanisole are used per hundred of polysulfide liquid polymer, no significant advantage is obtained over the use of lesser quantities. The amount of orthonitroanisole to be used in any specific curable composition will depend not only upon the properties desired in the end article, such as hardness, etc., but also upon the molecular weight and type of polysulfide liquid polymer used, the type and amounts of metal oxide curing catalyst used and also upon the types and amounts of adjuvants such as plasticizers, reinforcing and pigmenting fillers, etc., that are employed. Withal, where orthonitroanisole is used in from 2 to 50 parts by weight in intimate admixture with metal oxide curing agents per 100 parts by weight of polysulfide liquid polymers the desirable objects of this invention are attained. The most useful quantities within this usable range are about 3 to 15 parts by weight of orthonitroanisole per 100 parts by weight of polymer.

Various metal oxide curing agents have proved useful in the vulcanization of polysulfide liquid polymers. Some have already been alluded to and are useful in the practice of this invention; in addition, $Sb_2O_3$, as reported in U.S. 3,036,049, $MgO_2$, $TeO_2$ and $SeO_2$ also benefit from use with orthonitroanisole. The curing agents which exhibit an outstanding synergistic activity with orthonitroanisole include $MnO_2$, $MnO_2$ coated with manganite, and $TeO_2$ for polymers of low molecular weight, and $SeO_2$, $Sb_2O_3$, $CaO_2$, $MgO_2$ and $PbO_2$ for polymers of higher molecular weight. This synergistic effect is especially evident in the cure of the liquid polysulfide polymers of low molecular weight, e.g., 500 to 2,000. Whereas other nitroaryl and nitroalkyl compounds provide for short working lives in curable polysulfide compositions with these metal oxides and provide vulcanizates which may bloom quite badly, the use of orthonitroanisole with these metal oxides and liquid polysulfides provides compositions having prolonged work life which cure quickly at elevated temperatures to bloom-resistant rubbers. The metal oxide curing agents are usefully employed with orthonitroanisole in quantities that are substantially less than that required when used alone to achieve the same level of cure of the polysulfide polymers at an elevated temperature. These amounts will vary depending upon the nature of the product desired, the physical properties sought therein and the nature of the particular metal oxide and adjuvants employed in the curable compositions. In general, useful amounts will vary from about one to more than twenty parts by weight of metal oxide per one hundred parts by weight of polysulfide liquid polymer, and together with the orthonitroanisole used these amounts are enough to oxidize substantially all of the free —SH groups present in the polymer.

The curable compositions of this invention are prepared by placing the liquid polysulfide polymers, metal oxide curing agents, orthonitroanisole and adjuvants, where the latter may be used, into uniform and intimate admixture, as by mixing by hand, on a paint mill or in an internal mixer. The compositions may be prepared in one effort and at one time by mixing together all components. They also may be prepared, especially where considerations of considerably long termed storage are paramount, as several partial mixtures of blended components, variously known as two-package or three-package compositions. These partial mixtures are then subsequently combined into a blend of all necessary components prior to use. For example, one partial mixture may contain the liquid polysulfide polymers and the orthonitroanisole, and the other partial mixture the metal oxide in a liquid vehicle. Optionally, the polymer may be by itself or with adjuvants as one partial mixture, and the second mixture may consist of the orthonitroanisole and the metal oxide. Adjuvants may conveniently be distributed between the storable partial mixtures. For purposes of long termed storage it is desirable to store the polymers separate from the metal oxides. At the time of use the component ingredients, whether as separate substances or as premixed partial mixtures are blended to form a single mixture, and degassed prior to cure.

The novel curing process of this invention may be considered as essentially a two step process which includes as the first step the admixture of at least the necessary component ingredients required to form the curable compositions of the invention. In the second step the blended curable compositions are cured at elevated tempratures of about 140 to 200° F. for about ½ to 8 hours. The vulcanized article obtained thereby is then cooled and recovered prior to use.

More detailed illustrations of specific embodiments of the novel curable compositions, the novel cure process and the novel vulcanizates of this invention are contained in the examples. These examples are merely illustrative of the present invention are not intended as a limitation upon the scope of the claims.

In the following examples, an intimate blend of the ingredients of the curable compositions was prepared by milling together the polysulfide liquid polymer with the nitroaryl compound used and at least a portion of the other adjuvants as one partial mixture, and by milling together the metal oxide in a liquid vehicle with perhaps some of the other adjuvants as the second partial mixture, then combining the two partial mixtures by hand mixing at room temperature to form the specific curable composition. The working life of the curable compositions was observed to be that interval at room temperature from the time of mixing to the time when the compositions were no longer pourable. The cure time was observed to be that interval at a specified elevated temperature in which one obtained a tack-free elastomeric solid. The cure times listed herein are merely times which happened to be observed and are not necessarily the minimum cure times required. In general, the compositions were cured to form vulcanizates in the form of test sheets. These were examined for physical property data, such as tensile properties (ASTM D412–51T) and hardness (ASTM D676–59T).

Polysulfide polymers of different molecular weights were used; LP–8 polysulfide liquid polymer has a molecular weight of about 600, a 2% crosslink with trichloropropane and a backbone that is essentially

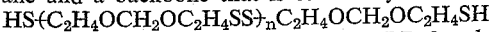

LP–3 and LP–2 polymers are similar to LP–8 polymer, except that the molecular weights are higher, i.e., about 1,000 for LP–3 polymer and about 4,000 for LP–2 polymer. The nitroaryl compounds used were commerical grade chemicals. The manganese dioxide used in these examples was Manganese Hydrate No. 37, a substance being 70% $MnO_2$, 22% water of hydration, 43.8% manganese and 12.5% in available oxygen. The tellurium dioxide used was analyzed as 95% $TeO_2$. The solvent vehicles used were Aroclor 1254, a polychlorinated biphenyl of 54% chlorine, and HB–40, a partially hydrogenated terphenyl. Occasionally a surface active agent, Duponol L-144-WDG was used. This is a sodium salt of a modified unsaturated long chain alcohol sulfate. All ingredients are given in parts by weight (pbw). Aroclor 1242 is chemically similar to Aroclor 1254, but is a less viscous liquid and has a chlorine content of 42%.

| Example | 1 | 2 | 3 | 4 | 5 | 6 | 7 |
|---|---|---|---|---|---|---|---|
| Curable Composition Recipe, in pbw: | | | | | | | |
| LP-8 polysulfide polymer | 100 | | | | | | |
| LP-3 polysulfide polymer | | | 100 | 100 | 100 | 100 | 100 |
| LP-2 polysulfide polymer | | 100 | | | | | |
| $MnO_2$ | 6 | 2.38 | 2.12 | 2.12 | 2.5 | | |
| $TeO_2$ | | | | | | 4.5 | 4.5 |
| Orthonitroanisole | 4 | 3 | 5 | | 12 | 5 | |
| 2,4-dinitrobenzene | | | | 5 | | | 5 |
| Sterling MT, carbon black | | 0.6 | 30.5 | 30.5 | 30 | 30 | 30 |
| Titanox RA-50, titanium dioxide | | 25 | | | | | |
| HB 40 terphenyl | | 1.8 | 1.6 | 1.6 | | | |
| Aroclor 1254 biphenyl | 6 | | | | 2.5 | | 3 |
| $CuCl_2$ | | 0.01 | 0.01 | 0.01 | | | |
| Duponol L-144-WDG | | | | | | 0.17 | 0.17 |
| Water | | 0.01 | 0.01 | 0.01 | | | |
| Aroclor 1242, biphenyl | | | | | | 3 | |
| Curing Conditions: | | | | | | | |
| Working life, at 80° F., in hours | >280 | .10 | >25 | 0.8 | >48 | 28.5 | <1 |
| Curing temperature, in ° F | 180 | 158 | 180 | 180 | 180 | 180 | |
| Curing time observed, in hours | 29 | 0.9 | 5 | 5 | <24 | 2.25 | |
| Physical Properties of Vulcanizate: | | | | | | | |
| Conditioning temperature after cure, in ° F | | | | | 180 | 180 | 180 |
| Conditioning time after cure, in hours | | | | | 24 | 16 | 16 |
| Tensile strength, in p.s.i. | | | 175 | 230 | 190 | 190 | 200 |
| Elongation, in percent | | | 260 | 270 | 370 | 265 | 270 |
| Hardness, in Shore A durometer degrees | 5 | 25 | 36 | 44 | 32 | 38 | 40 |

Examples 1 and 2 indicate that regardless of molecular weight, polysulfide liquid polymers will form curable compositions with orthonitroanisole having a long termed working life. Examples 3 and 4 demonstrate the differences in working life obtained with curable polysulfide polymer based compositions using orthonitroanisole and manganese dioxide on the one hand and a nitroaryl of the prior art, dinitrobenzene, with manganese dioxide on the other hand. Example 5 shows a curable polysulfide polymer based composition using orthonitroanisole near the upper end of the preferred range of concentration. Examples 6 and 7 contrast the properties of curable polysulfide polymer based compositions, as as working life, using another curing agent, $TeO_2$, with orthonitroanisole in one, and dinitrobenzene in the other composition.

In instances where orthonitroanisole was used, the vulcanizates were substantially bloom-resistant; whereas when dinitrobenzene was used the vulcanizates often exhibited bloom.

I claim:

1. A curable composition comprising, in weight ratio, (a) one hundred parts by weight of polysulfide polymer that is ordinarily liquid at 25° C. and of the formula $HS(RSS)_nRSH$, wherein R is a divalent aliphatic radical selected from the group consisting of alkylene, oxahydrocarbon and thiahydrocarbon radicals; (b) about one to twenty parts by weight of metal oxide curing agent; and (c) about two to fifty parts by weight of orthonitroanisole.

2. A curable composition as in claim 1 wherein the metal oxide curing agent is at least one selected from the group consisting of manganese, tellurium, selenium, antimony, calcium, magnesium and lead oxide curing agents.

3. A curable composition as in claim 2 wherein said metal oxide curing agent is manganese dioxide.

4. A curable composition as in claim 2 wherein said metal oxide curing agent is tellurium dioxide.

5. A method for curing liquid polysulfide polymer of the formula $HS(RSS)_nRSH$ wherein R is a divalent aliphatic radical selected from the group consisting of alkylene, oxahydrocarbon and thiahydrocarbon radicals comprising, (a) admixing with said polymer about 2 to 50 parts by weight of orthonitroanisole and one to twenty parts by weight of metal oxide curing agent per one hundred parts by weight of polymer, and (b) subjecting the admixture of step (a) to elevated curing temperatures.

6. The vulcanizate of claim 5.

7. A method as in claim 5 wherein said metal oxide curing agent is selected from the group consisting of manganese, tellurium, selenium, antimony, calcium, magnesium and lead oxide curing agents.

8. A method as in claim 7 wherein said metal oxide curing agent is manganese dioxide.

9. A method as in claim 7 wherein said metal oxide curing agent is tellurium dioxide.

10. The vulcanizate of claim 7.

11. The vulcanizate of claim 8.

12. The vulcanizate of claim 9.

References Cited by the Examiner

UNITED STATES PATENTS

| | | | |
|---|---|---|---|
| 2,195,380 | 3/1940 | Patrick | 260—79.1 |
| 2,370,524 | 2/1945 | Denison et al. | 260—612 |
| 2,940,959 | 6/1960 | Rosenthal et al. | 260—79.1 |

OTHER REFERENCES

Behrend, Chem. Abstr., vol. 58, 8103g, April 15, 1963.

LEON J. BERCOVITZ, *Primary Examiner.*

M. I. MARQUIS, *Assistant Examiner.*